United States Patent [19]

Nakamura et al.

[11] Patent Number: 4,766,052
[45] Date of Patent: Aug. 23, 1988

[54] PHOTOGRAPHIC ELEMENT WITH POLYMERIC IMIDAZOLE DYE MORDANT

[75] Inventors: Taku Nakamura; Koichi Nakamura; Hiroshi Hayashi, all of Kanagawa, Japan

[73] Assignee: Fuji Photo Film Co., Ltd., Minami-ashigara, Japan

[21] Appl. No.: 86,245

[22] Filed: Aug. 17, 1987

Related U.S. Application Data

[63] Continuation of Ser. No. 731,695, May 8, 1985, abandoned.

[30] Foreign Application Priority Data

May 8, 1984 [JP] Japan .................... 59-91620

[51] Int. Cl.⁴ .................................... G03C 5/54
[52] U.S. Cl. ................................ 430/203; 430/213; 430/941; 526/258; 526/263
[58] Field of Search ............. 430/213, 518, 941, 630, 430/545, 559, 203; 526/258, 263

[56] References Cited

U.S. PATENT DOCUMENTS

| | | | |
|---|---|---|---|
| 3,449,123 | 6/1969 | Kondo et al. ............... | 430/630 |
| 4,115,124 | 9/1978 | Hamilton et al. ............ | 430/941 |
| 4,124,386 | 11/1978 | Yoshida et al. ............. | 430/213 |
| 4,154,615 | 5/1979 | Sato et al. ................. | 430/213 |
| 4,273,853 | 6/1981 | Ponticello et al. ........... | 430/213 |
| 4,282,305 | 8/1981 | Brust et al. ................ | 430/213 |
| 4,450,224 | 5/1984 | Klein et al. ................ | 430/213 |
| 4,500,626 | 2/1985 | Naito et al. ................ | 430/203 |
| 4,533,621 | 8/1985 | Ikeuchi et al. .............. | 430/213 |
| 4,585,724 | 4/1986 | Helling et al. .............. | 430/213 |
| 4,594,308 | 6/1986 | Nakamura et al. ............ | 430/941 |
| 4,619,883 | 10/1986 | Aono et al. ................. | 430/213 |

FOREIGN PATENT DOCUMENTS

| | | |
|---|---|---|
| 0009411 | 4/1980 | European Pat. Off. . |
| 0131509 | 1/1985 | European Pat. Off. . |
| 0143389 | 6/1985 | European Pat. Off. . |
| 2533137 | 2/1976 | Fed. Rep. of Germany . |
| 2728557 | 12/1977 | Fed. Rep. of Germany . |
| 3345070 | 6/1985 | Fed. Rep. of Germany . |

OTHER PUBLICATIONS

U.S. patent application Ser. No. 598,952, now abandoned.

Primary Examiner—Richard L. Schilling
Attorney, Agent, or Firm—Sughrue, Mion, Zinn, Macpeak & Seas

[57] ABSTRACT

A photographic element containing a polymer comprising a recurring unit of general formula (I) and at least one recurring unit selected from the group of units of general formulae (II), (III) and IV)

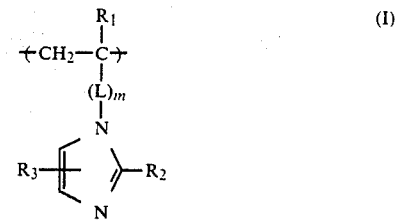

wherein $R_1$, $R_2$ and $R_3$ each represents a hydrogen atom or an alkyl group of 1 to 6 carbon atoms; L represents a divalent linking group of 1 to 20 carbon atoms; and m is 0 or 1;

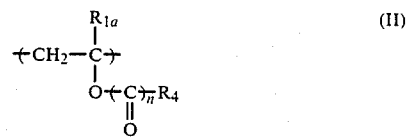

wherein $R_{1a}$ represents a hydrogen atom or an alkyl group of 1 to 6 carbon atoms; $R_4$ is an alkyl group, an aryl group or an aralkyl group; and n is 0 or 1;

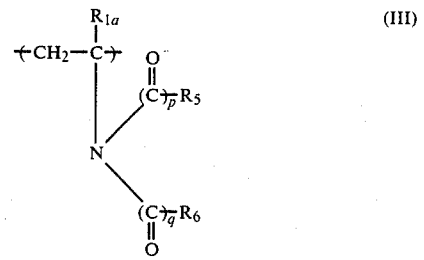

wherein $R_{1a}$ is as defined in general formula (II); $R_5$ and $R_6$ each represents a hydrogen atom or an alkyl group, an alkoxy group, an aryl group or an aralkyl group; and p and q each is equal to 0 or 1; and

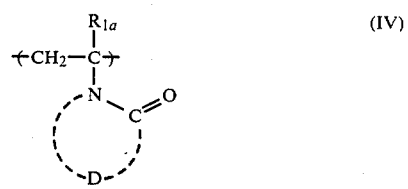

wherein $R_{1a}$ is as defined in general formula (II); and D is a divalent linking group necessary for the formation of a 5- to 7-membered ring with the nitrogen atom and carbonyl group.

19 Claims, No Drawings

PHOTOGRAPHIC ELEMENT WITH POLYMERIC IMIDAZOLE DYE MORDANT

This is a continuation of application Ser. No. 731,695 filed May 8, 1985, now abandoned.

FIELD OF THE INVENTION

This invention relates to a polymer which is an effective mordant for dyes used in photographic elements and a photographic element containing said polymer. More particularly, this invention relates to a mordant for fixing an imagewise-formed diffusible dye and a color photographic element comprising a layer containing said mordant.

BACKGROUND OF THE INVENTION

It is known in the art of photography to use quaternary ammonium salt polymers, such as those described in, for example, U.S. Pat. Nos. 3,709,690, 3,958,995 and 3,898,088, as mordants for fixing anionic dyes. While polymers of this type function as good mordants for anionic dyes, they are deficient in keeping the mordant-fixed dyes in a stable condition. A photographic system containing a dye image mordanted with such a dye mordant has another disadvantage in that the mordanted image dye is liable to undergo chemical change or degradation upon exposure to fluorescent light, solar radiation or the like.

On the other hand, the polymers having a tertiary imidazole ring system in the side chain as described in, for example, British Patent No. 2,056,101, U.S. Pat. Nos. 4,115,124, 4,282,305, and 4,273,853, are capable of keeping the mordanted dyes stable against light but are deficient in mordanting activity.

SUMMARY OF THE INVENTION

It is an object of this invention to provide a dye mordant having a high mordanting action and which is capable of keeping the mordanted dye stable against light.

It is another object of this invention to provide a photographic element containing such a mordant having a high mordanting action and which is capable of keeping the mordanted color stable against light.

DETAILED DESCRIPTION OF THE INVENTION

The above-mentioned objects have been met by a polymer which comprises a recurring unit of general formula (I) and at least one of recurring units of general formulae (II), (III) and (IV) and a photographic element which contains the above-mentioned polymer.

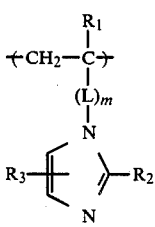

General formula (I)

In general formula (I), $R_1$, $R_2$ and $R_3$ each represents a hydrogen atom or an alkyl group containing 1 to 6 carbon atoms; L is a divalent linking group containing 1 to 20 carbon atoms; and m is 0 or 1.

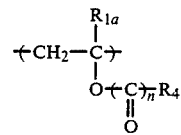

General formula (II)

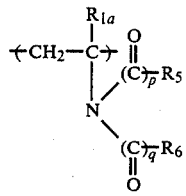

General formula (III)

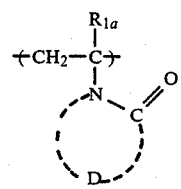

General formula (IV)

In general formulae (II), (III) and (IV), $R_{1a}$ represents a hydrogen atom or an alkyl group containing 1 to 6 carbon atoms. In general formula (II), $R_4$ is an alkyl group, an aryl group or an aralkyl group. In general formula (III), $R_5$ and $R_6$ each represents a hydrogen atom or an alkyl group, an alkoxy group, an aryl group or an aralkyl group. In general formula (IV), D is a divalent linking group which is necessary for the formation of a 5- to 7-membered ring with the nitrogen atom and carbonyl group; and n, p and q each is 0 or 1.

The polymer according to this invention may contain two or more kinds of monomer units of different general formulae among general formulae (II), (III) and (IV) or two or more kinds of monomer units of one and the same general formula selected from among said general formulae (II), (III) and (IV).

Referring, further, to general formula (I), $R_1$, $R_2$ and $R_3$ each represents a hydrogen atom or a lower alkyl group of 1 to 6 carbon atoms such as methyl group, ethyl group, n-propyl group, n-butyl group, n-amyl group and n-hexyl group. Preferred are hydrogen atom methyl group and ethyl group.

L is a divalent linking group containing 1 to about 20 carbon atoms, such as alkylene groups (e.g., methylene group, ethylene group, trimethylene group, hexamethylene group, etc.), phenylene groups (e.g., o-phenylene group, p-phenylene group, m-phenylene group, etc.), arylenealkylene groups (e.g.,

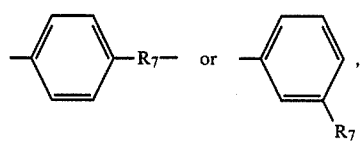

etc., wherein $R_7$ is an alkylene group of 1 to 12 carbon atoms), $-CO_2-$, $-CO_2-R_8-$ (wherein $R_8$ is an alkylene group, a phenylene group or an arylenealkylene group), $-CONH-R_8$ (wherein $R_8$ is as defined above),

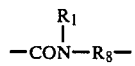

(wherein $R_1$ and $R_8$ are as defined above), etc. Preferred are

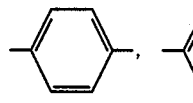

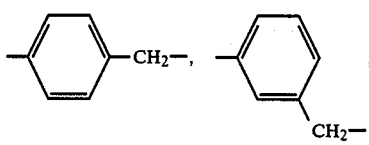

—$CO_2$—, —CONH—, —$CO_2CH_2CH_2$—, —$CO_2$—$CH_2CH_2CH_2$—, —$CONHCH_2$—, —$CONHCH_2CH_2$—, —$CONHCH_2CH_2CH_2$—, etc.

Preferred examples of the monomer unit of general formula (I) are as follows.

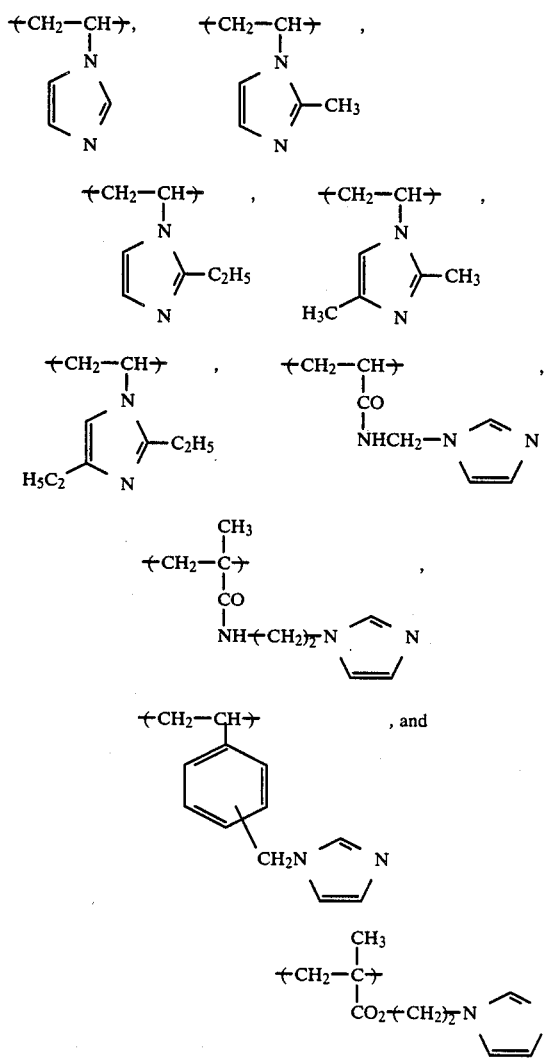

Regarding the above general formulae (II) and (III), $R_{1a}$ represents a hydrogen atom or a lower alkyl group of 1 to 6 carbon atoms such as methyl group, ethyl group, n-propyl group, n-butyl group, n-amyl group and n-hexyl group. Preferred are hydrogen atom, methyl group and ethyl group. $R_4$, $R_5$ and $R_6$ each is, for example, an alkyl group (e.g., unsubstituted alkyl group such as methyl group, ethyl group, n-propyl group, n-butyl group, isobutyl group, n-amyl group, hexyl group, n-nonyl group, n-decyl group or n-dodecyl group), a substituted alkyl group (e.g., methoxyethyl group, 3-cyanopropyl group, ethoxycarbonylethyl group, acetoxyethyl group, hydroxyethyl group or 2-butenyl group), an aryl group (e.g., phenyl group, tolyl group or naphthyl group), or an aralkyl group (e.g., unsubstituted aralkyl group such as benzyl group, phenetyl group, diphenylmethyl group or naphthylmethyl group, or substituted aralkyl group such as 4-methylbenzyl group, 4-isopropylbenzyl group, 4-methoxybenzyl group, 4-(4-methoxyphenyl)benzyl group or 3-chlorobenzyl group), and preferably is a methyl group, an ethyl group, a n-butyl group, an isobutyl group, a phenyl group or a benzyl group. $R_5$ and $R_6$ each represents a hydrogen atom, which is also preferred, as well as any of the above-mentioned groups.

Preferred examples of the monomer unit represented by general formula (II) which are usable in the practice of the invention are given below.

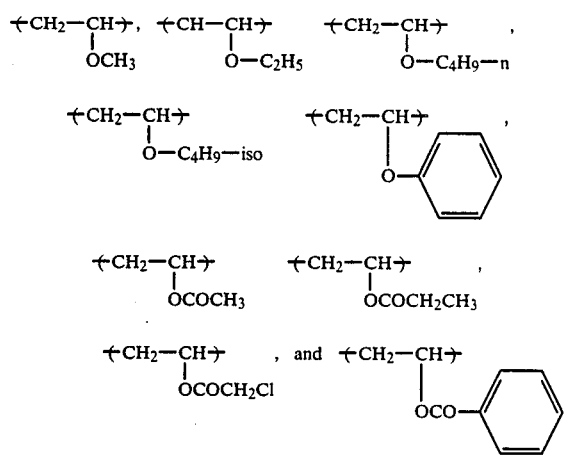

Examples of the monomer unit represented by general formula (III) which are usable in the practice of this invention include the monomer units corresponding to the polymers of N-vinyl compounds described in Murahashi, Imoto and Tani: *Gosei Kobunshi* (*Synthetic High Polymers*) III, Asakura Shoten (1971), pages 1–51. Preferred examples of the monomer unit represented by general formula (III) are given below.

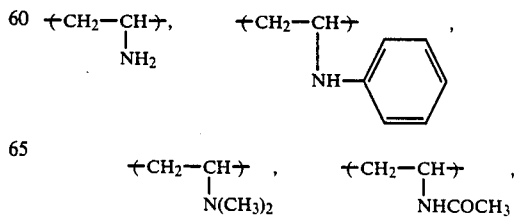

-continued

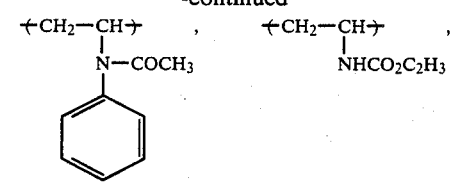

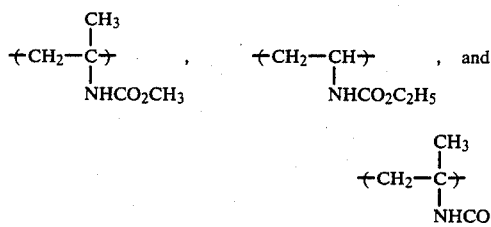

Referring to general formula (IV), $R_{1a}$ represents a hydrogen atom or a lower alkyl group of 1 to 6 carbon atoms such as methyl group, ethyl group, n-propyl group, n-butyl group, n-amyl group and n-hexyl group. Preferred are hydrogen atom, methyl group and ethyl group. D represents a divalent linking group which forms, together with the nitrogen atom and carbonyl group, a 5- to 7-membered ring. As examples of the monomer unit represented by general formula (IV), there may be mentioned the units corresponding to the polymers of N-vinyl compounds described in the above-described *Gosei Kobunshi* III. The linking group D includes divalent groups composed of carbon atoms (e.g., —CH₂CH₂CH₂—, —CH₂CH₂CH₂CH₂—, —CH₂CH₂CH₂CH₂CH₂—,

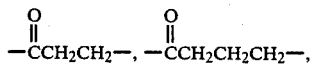

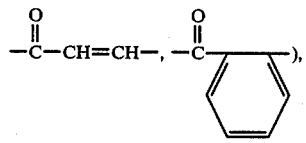

divalent groups composed of carbon atoms and a nitrogen atom (e.g., —NHCH₂CH₂—,

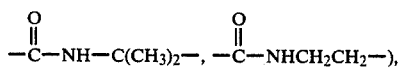

divalent groups composed of carbon atoms and an oxygen atom (e.g., -OCH₂CH₂,

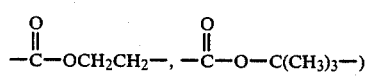

and divalent groups composed of carbon atoms and a sulfur atom (e.g., —SCH₂CH₂—,

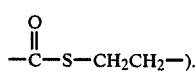

Among them, particularly preferred are those divalent linking groups composed of carbon atoms or of carbon atoms and a nitrogen atom.

Preferred examples of the monomer unit represented by general formula (IV) are given below.

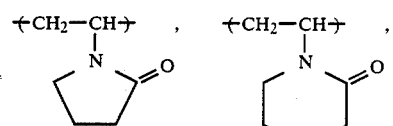

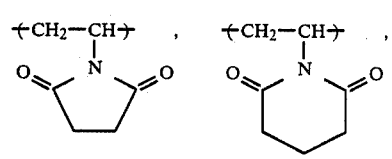

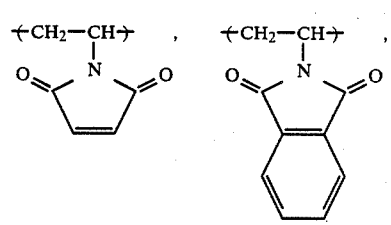

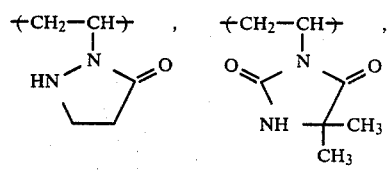

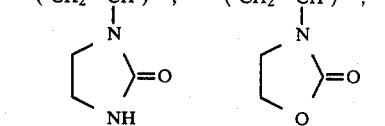

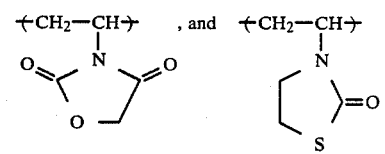

In the polymer according to this invention, the monomer unit represented by general formula (I) is from 10 to 98 mol %, preferably 40 to 90 mol %, of the total monomer, and the monomer unit represented by general formula (II), (III) or (IV) is from 2 to 60 mol %, preferably 10 to 50 mol %, of the total monomer. Though other monomers may also be contained, their proportion is preferably not more than 40 mol % of the total monomer.

The molecular weight of the polymer according to this invention is preferably in the range of $5 \times 10^3$ to $1 \times 10^7$. If the molecular weight is too low, the polymer tends to migrate, while the use of a polymer of excessively large molecular weight results in coating troubles. The most desirable range is $1 \times 10^4$ to $2 \times 10^6$.

Preferred examples of the polymer according to this invention are as follows.

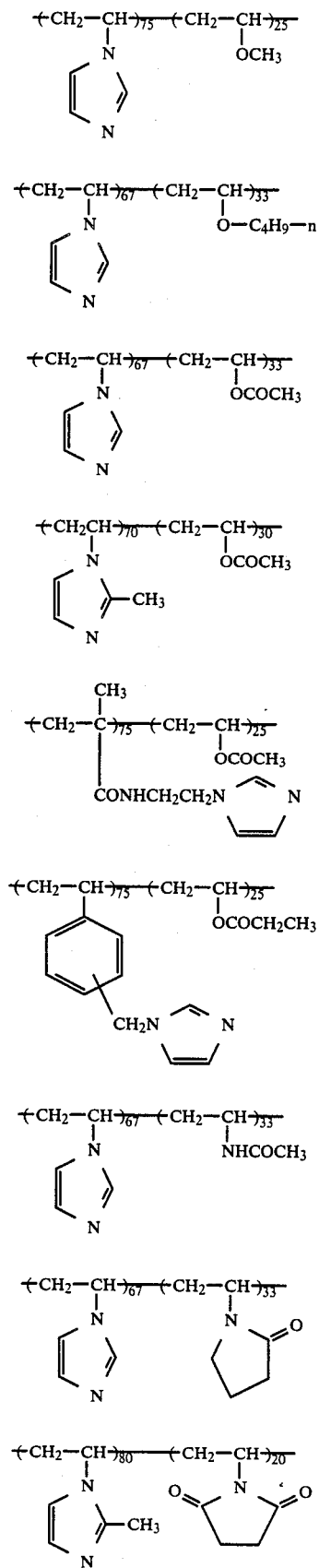

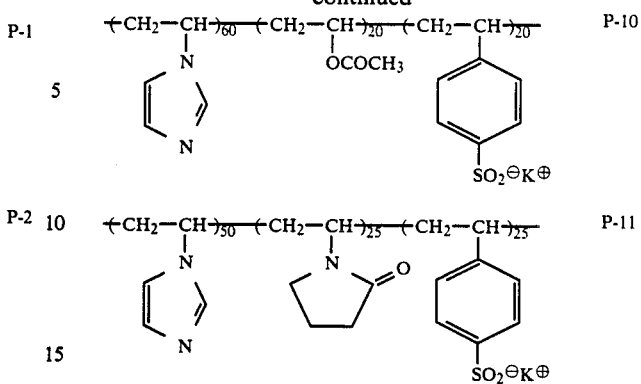

Synthesis examples of the polymer according to this invention are as follows.

SYNTHESIS EXAMPLE 1

Synthesis of poly(1-vinylimidazole-co-vinyl acetate) (P-3)

A three-necked flask of 200 ml capacity was charged with 62.0 g of 1-vinylimidazole, 28.4 g of vinyl acetate and 60 ml of ethanol, and after substituting air with nitrogen gas in the flask, the flask was heated to 75° C. When the temperature became constant, 1,242 g of 2,2'-azobis(2,4-dimethylvaleronitrile) was added and under constant heating, the reaction was continued for 2 hours, at the end of which time 1.242 g of 2,2'-azobis(2,4-dimethylvaleronitrile) was further added. The heating was further continued for 3 hours, after which the reaction mixture was cooled to room temperature and dialyzed in a cellulose tube by tap water for 2 days, followed by freeze-drying to give 59.5 g of polymer. Yield 66%.

SYNTHESIS EXAMPLE 2

Synthesis of poly(1-vinylimidazole-co-N-vinyl-2-pyrrolidone) (P-8)

A three-necked flask of 200 ml capacity was charged with 31.3 g of 1-vinylimidazole, 18.9 g of N-vinyl-2-pyrrolidone and 50.0 g of dimethylformamide, and after substituting air with nitrogen gas in the flask, the flask was heated to 70° C. When the temperature became constant, 0.615 g of 2,2'-azobis(2,4-dimethylvaleronitrile) was added and as the heating was continued, 0.615 g of 2,2'-azobis(2,4-dimethylvaleronitrile) was further added after 2 and 4 hours, respectively. The heating was further continued for 3 hours, after which the reaction mixture was cooled to room temperature, poured in 1.5 l of acetone, and dried in vacuum to give 50.0 g of polymer.

SYNTHESIS EXAMPLE 3

Synthesis of poly(1-vinylimidazole-co-N-vinyl-2-pyrrolidone-co-potassium styrenesulfinate) (P-11)

A three-necked flask of 500 ml capacity was charged with 47.1 g of 1-vinylimidazole, 27.8 g of N-vinyl-2-pyrrolidone, 51.5 g of potassium styrenesulfinate and 200 g of distilled water, and after substituting air with nitrogen gas in the flask, the flask was heated to 75° C. When the temperature became constant, 0.904 g of 2,2'-azobis(2-amidinopropane)hydrochloride was added and as the heating was continued, 0.904 g of 2,2'-azobis(2- amidinopropane)hydrochloride was further added after 2 and 4 hours, respectively. Then, the heating was further continued for 3 hours, after which the reaction mixture was cooled to room temperature to give 326 g of polymer aqueous solution.

The polymer according to this invention is used either alone or in combination with a binder in the mordant layer of the photographic element. A suitable hydrophilic binder can be used as said binder. Examples of such hydrophilic binder include transparent or translucent hydrophilic colloids such as proteins, e.g., gelatin, gelatin derivatives, etc., cellulose derivatives, polysaccharides, e.g., starch, gum arabic, etc., and other natural substances, as well as synthetic polymers such as polyvinylpyrrolidone, polyacrylamide, polyvinyl alcohol and other water soluble polyvinyl compounds. Preferred are gelatin and polyvinyl alcohol.

The above-mentioned mordant layer may be present in the light-sensitive material or in the dye fixing material.

The ratio of the polymer mordant of this invention to the binder and the coating amount of the polymer mordant may be easily selected by those skilled in the art in accordance with the amount of dye to be mordanted, the type and composition of the polymer mordant, the image-forming process used, etc. Generally speaking, the mordant/binder ratio is 20/80 through 80/20 by weight and the coating amount of the mordant is 0.2 to 15 g/m$^2$, preferably 0.5 to 8 g/m$^2$.

The mordant layer containing the polymer mordant of this invention may further contain various surfactants for improved coating properties.

In the formation of such a mordant layer, the polymer of this invention may be used in combination with a gelatin hardening agent.

Examples of such hardening agent which can be used in this invention include aldehydes (e.g., formaldehyde, glyoxal, glutaraldehyde, etc.), N-methylol compounds (dimethylolurea, methyloldimethylhydantoin, etc.), dioxane derivatives (e.g., 2,3-dihydroxydioxane, etc.), active vinyl compounds [1,3,5-triacryloyl hexahydro-s-triazine, bis(vinylsulfonyl)methylether, N,N'-ethylene bis(vinylsulfonylacetamide), N,N'-trimethylene-bis(-vinylsulfonylacetamide), etc.], active halogen compounds (2,4-dichloro-6-hydroxy-s-triazine, etc.), mucohalic acids (mucochloric acid, mucophenoxychloric acid, etc.), isoxazoles, dialdehyde starch, and 1-chloro-6-hydroxytriazinylated gelatin, etc. These are specifically described, for example, in U.S. Pat. Nos. 1,870,354, 2,080,019, 2,726,162, 2,870,013, 2,983,611, 2,992,109, 3,047,394, 3,057,723, 3,103,437, 3,321,313, 3,325,287, 3,362,827, 3,490,911, 3,539,644 and 3,543,292, British Patent Nos. 676,628, 825,544 and 1,270,578, German Patent Nos. 872,153, 1,090,427 and 2,749,260 and Japanese Patent Publication Nos. 7133/59 and 1872/71.

Among these gelatin hardening agents, aldehydes, active vinyl compounds and active halogen compounds are particularly preferred.

These hardening agents may be added either directly to a coating solution for the mordant layer or, alternatively, to a different coating solution so that it will diffuse into the mordant layer during the multicoating process.

The amount of said hardening agent for the purposes of this invention can be optionally selected in accordance with the purposes. However, its amount is generally 0.1 to 20 wt % and preferably 1 to 8 wt % based on the weight of gelatin.

In using the polymer of this invention as a dye mordant, the dye transfer density may be increased by incorporating a metal ion in the dye fixing material. Such a metal ion is incorporated in the mordant layer containing the polymer mordant of this invention or in the layer either over or beneath the mordant layer. The metal ion mentioned just above is preferably colorless and stable against heat and light. Thus, multivalent transition metal ions such as $Cu^{2+}$, $Zn^{2+}$, $Ni^{2+}$, $Pt^{2+}$, $Pd^{2+}$, $CO^{3+}$, etc. are preferred and $Zn^{2+}$ is especially preferred. The metal ion is generally added in the form of a water-soluble compound such as $ZnSO_4$, $Zn(CH_3CO_2)_2$, etc., and its adding amount is 0.01 to 5 g/m$^2$, and preferably 0.1 to 1.5 g/m$^2$.

In the layer to which such a metal ion is added, there may be incorporated a hydrophilic polymer as binder. The hydrophilic binder is most commonly a transparent or translucent colloid such as proteins, e.g., gelatin and its derivatives, cellulose derivatives, polysaccharides, e.g., starch, gum arabic, etc., and other natural materials, as well as synthetic polymers such as polyvinylpyrrolidone, polyacrylamide, polyvinyl alcohol, and other water soluble polyvinyl compounds.

In particular, gelatin and polyvinyl alcohol can be used effectively.

The image-forming dye which is mordanted on the mordant layer according to this invention includes azo dyes, azomethine dyes, anthraquinone dyes, naphthoquinone dyes, styryl dyes, nitro dyes, quinoline dyes, carbonyl dyes and phthalocyanine dyes, which have anionic groups such as phenolic hydroxy group, sulfonamido group, sulfonyl group, carboxyl group and other groups. The mordant layer of this invention can be advantageously employed for fixing the dye in the color image forming process in which a diffusible dye is formed in an imagewise pattern, caused to diffuse and, then, fixed.

While the above-mentioned color image forming process may take various forms such as the process employing a developer at or near room temperature (for example, the process described in Belgian Patent No. 757,959), the process using heat development (e.g., Japanese Patent Application (OPI) Nos. 58543/83 and 79247/83) (the term "OPI" as used herein means a "published unexamined Japanese patent application"), etc., the mordant layer of this invention can be used in any of such image forming processes.

The dye-providing substance useful for the above-mentioned heat development process may be represented by the general formula (I).

$$D—Y \qquad (I)$$

Herein, D represents a dye moiety or a precursor thereof, and Y represents a substrate having such a function as to change the diffusibility of the dye providing substance (I) upon the redox reaction caused in the heat development step.

The expression "change in diffusibility" is intended to include the cases wherein (1) the compound (I) is nondiffusible originally, and it is changed into diffusible one or releases a diffusible dye, and (2) the compound (I) is originally diffusible, and changed into nondiffusible one. This change is caused by oxidation of Y or reduction of Y according to the nature of Y, and this two reactions are used appropriately according to the circumstances.

As examples of Y whose diffussibility is changed by oxidation, mention may be made of the so-called dye releasing redox substrates such as p-sulfonamidonaphthols (including p-sulfonamidophenols, and specific examples thereof are described in Japanese Patent Application (OPI) Nos. 33826/73 and 50736/78, and European Patent No. 76,492), o-sulfonamidophenols (including o-sulfonamidonaphthols, and specific examples thereof are described in Japanese Patent Application (OPI) Nos. 113624/76, 12642/81, 16130/81, 16131/81, 4043/82 and 650/82, U.S. Pat. No. 4,053,312, and European Patent No. 76,492), hydroxysulfonamidoheterocyclic rings (with specific examples described in Japanese Patent Application (OPI) No. 104343/76 and European Patent No. 76,492), 3-sulfonamidoindoles (with specific examples described in Japanese Patent Application (OPI) Nos. 104343/76, 46730/78, 130122/79 and 85055/82 and European Patent No. 76,492), α-sulfonamidoketones (with specific examples described in Japanese Patent Application (OPI) Nos. 3819/78 and 48534/79 and European Patent No. 76,492, etc.).

As examples of Y of a different type which release a dye by intramolecular nucleophilic attack after oxidation, mention may be made of intramolecular assist type substrates described in Japanese Patent Application (OPI) No. 20735/82 and European Patent Application 0106211A.

As examples of Y of another different type which releases a dye by an intramolecular ring closure reaction under alkaline conditions, but causes substantially no release of a dye when oxidized, mention may be made of the substrates described in Japanese Patent Application (OPI) No. 63618/76. In addition, substrates which are modifications of the above-described type of Y, and release dyes through winding change caused in an isoxazoline ring by a nucleophilic agent (specific examples of which are described in Japanese Patent Application (OPI) Nos. 111628/74 and 4819/77) are also useful.

As examples of Y of still another different type, mention may be made of substrates which can release their dye moieties through dissociation of acidic proton under alkaline conditions, but cause substantially no release of dyes when oxidized (specific examples of which are described in Japanese Patent Application (OPI) Nos. 69033/78 and 130927/79).

On the other hand, examples of Y whose diffusibility is changed by reduction include nitro compounds described in Japanese Patent Application (OPI) No. 110827/78 and quinone compounds described in Japanese Patent Application (OPI) No. 110827/78 and U.S. Pat. Nos. 4,356,249 and 4,358,525. These compounds are reduced by a reducer (called an electron donor) remaining without consumed in the heat development process to produce nucleophilic groups, and release dyes through the molecular attack of the resulting nucleophilic groups. Substrate of the quinone type which are modification of the above-described quinone compounds, and release their dye moieties through dissociation of acidic proton of the reductant thereof are also useful. Specific examples of such quinone type substrates are described in Japanese Patent Application (OPI) Nos. 130927/79 and 164342/81. When the substrates of the kind which cause change in diffusibility by reduction, as described above, are employed, it is essential to use a proper reducer (electron donor) to mediate between a silver salt as oxidizing agent and a dye providing substance, and specific examples of suitable reducers which can be used are described in the above-described known data. In addition, substrates in which an electron donor is copresent (called LDA compounds) are also useful as Y.

Further, materials which undergo the redox reaction with silver halides or organic silver salts, and as a result thereof it follows that change in mobility of the products containing their dye moieties is caused can be employed as examples of another type of image forming material are described in Japanese Patent Application (OPI) No. 165054/84 under high temperatures.

Also, materials capable of releasing mobile dyes through the reaction with silver ion present in a light-sensitive material can be employed, and are described in Japanese Patent Application (OPI) No. 180548/84.

Many of the above-described materials produce the imagewise distribution of mobile dyes corresponding to an exposure pattern in the light-sensitive material by heat development, and the resulting image dyes are transferred into a dye fixing material (so-called diffusion transfer) and visualized therein. Methods for effecting such procedures are described in the patents cited above or European Patent Application No. 0119615A, etc.

The photographic element using the mordant layer according to this invention will be described hereinafter in further detail.

Such a photographic element using the mordant dye according to this invention generally consists of (1) a support, (2) a light-sensitive element and (3) an image-receiving element, and the development may be effected by heating or with a developing agent. In any case, the photographic element is first imagewise exposed and, then, the silver halide is developed, whereupon a diffusible dye is formed in the corresponding imagewise pattern and migrates onto the image-receiving element. The light-sensitive element and image-receiving element mentioned above may be disposed either on one and the same support or on independent supports.

In the above photographic element, a developing agent, an auxiliary developing agent and other processing agents may further be incorporated.

A preferred example of such process is disclosed in Belgian Patent No. 757,959. Further examples are given in U.S. Pat. Nos. 3,415,644, 3,415,645, 3,647,487 and 3,635,707, German Patent Application (OLS) No. 2,426,989, etc. Still more preferable examples in which the mordant according to this invention can be employed are the heat development processes described in Japanese Patent Application (OPI) Nos. 58543/83 and 79247/83, and so on.

The following examples are intended to illustrate this invention in further detail and should by no means be constructed as limiting the scope of the invention.

EXAMPLE 1

Preparation of the silver iodobromide emulsion

In 3000 ml of water are dissolved 40 g of gelatin and 26 g of potassium bromide and the solution is stirred at a constant temperature of 50° C. Then, a solution of 34 g of silver nitrate in 200 ml of water is added to the above solution over a period of 10 minutes.

Then, a solution of 3.3 g of potassium iodide in 100 ml of water is added over 2 minutes. The pH of the resulting silver iodobromide emulsion is adjusted to cause precipitation and the excess salt is removed. The pH is then adjusted to 6.0, whereby 400 g of a silver iodobromide emulsion is obtained.

Preparation of a benzotriazole silver emulsion

In 3000 ml of water are dissolved 28 g of gelatin and 13.2 g of benzotriazole and the solution is stirred at a constant temperature of 40° C. To this solution is added a solution of 17 g of silver nitrate in 100 ml of water over 2 minutes.

The pH of the resulting benzotriazole silver emulsion is adjusted to cause precipitation and the excess salt is removed. The pH is then adjusted to 6.0, whereby 400 g of a benzotriazole silver emulsion is obtained.

Preparation of a dispersion of a dye providing substance in gelatin 5 g of a cyan dye providing substance of the structure shown below, 0.5 g of sodium 2-ethylhexyl succinate sulfonate and 5 g of tricresyl phosphate (TCP) are weighed and dissolved in 30 ml of ethyl acetate under heating at about 60° C. to give a homogeneous solution. This solution is mixed with 100 g of a 10% solution of lime-treated gelatin with stirring and dispersed by means of a homogenizer at 10,000 r.p.m. for 10 minutes. The dispersion is referred to as "a dispersion of the dye providing substance (cyan)".

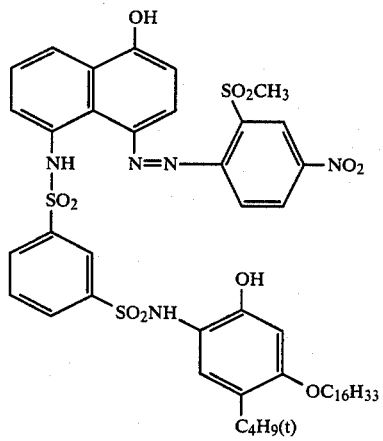

Preparation of a light-sensitive material

The following ingredients are mixed and dissolved and the mixture is coated on a polyethylene terephthalate film in a wet thickness of 30 μm, followed by drying.

| | | |
|---|---|---|
| (a) | Benzotriazole silver emulsion | 10 g |
| (b) | Silver iodobromide emulsion | 20 g |
| (c) | Dispersion of the above described dye providing substance (cyan) | 33 g |
| (d) | 5% aqueous solution of the compound having the following formula | 5 ml |
| | 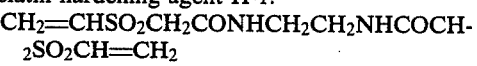 | |
| (e) | 10% ethanol solution of guanidine trichloroacetic acid | 12.5 ml |
| (f) | 10% aqueous solution of $H_2NSO_2N(CH_3)_2$ | 4 ml |
| (g) | Water | 7.5 ml |

As a protective layer, the following composition is spread on the above layer in a coating thickness of 25 μm and then dried.

| | | |
|---|---|---|
| (h) | 10% Gelatin aqueous solution | 35 g |
| (i) | 10% ethanol of guanidine trichloroacetate | 5 ml |
| (j) | 1% aqueous solution of sodium 2-ethylhexyl succinate sulfonate | 4 ml |
| (k) | Water | 56 ml |

Preparation of a dye fixing material

First, 0.75 g of gelatin hardening agent H-1 and 0.25 g of gelatin hardening agent H-2 are added to 160 ml of distilled water, followed by addition of 100 g of 10% acid-treated gelatin, and the mixture is evenly stirred.

A paper support laminated with a polyethylene film containing titanium oxide as dispersed therein is uniformly coated with the above mixture in a wet thickness of 60 μm, followed by drying. Then, 10 g of mordant HP-1 and 200 ml of distilled water are added, followed by addition of 100 g of 10% lime-treated gelatin. The mixture is evenly stirred and coated on the above layer in a wet thickness of 85 μm, followed by drying. This is referred to as "dye fixing material (A) containing mordant HP-1".

Dye fixing materials (B), (C) and (D) are prepared in the same manner as above except that 14.6 g of P-3, 16.1 g of P-8 and 26.8 g of P-11 are respectively used in lieu of the above mordant HP-1.

Gelatin hardening agent H-1:
$CH_2=CHSO_2CH_2CONHCH_2CH_2NHCOCH_2SO_2CH=CH_2$

Gelatin hardening agent H-2:
$CH_2=CHSO_2CH_2CONHCH_2CH_2CH_2NHCOCH_2SO_2CH=DCH_2$ Mordant HP-1

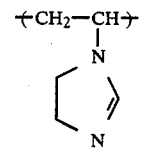

The above light-sensitive material was imagewise exposed to light at 2000 lux using a tungsten lamp and heated uniformly on a heat block at 130° C. for 30 seconds. Then, 10 ml/m² of water was applied on the coated side of the dye fixing material, which was then brought into contact with the coated side of the above heat-treated light-sensitive material and the assembly was heated on a heat block at 80° C. for 5 seconds, after which the dye fixing material was separated from the light-sensitive material, whereupon a cyan color negative image was obtained on the dye fixing material. The density of the negative image was measured by means of a Macbeth reflection densitometer RD-519.

Then, a transparent film having a ultraviolet absorbing layer was superposed on the above dye fixing material having a color negative image, and the dye image was irradiated with xenon light (100,000 lux) for 3 days. The light fastness of the dye image was evaluated on the basis of color density data before and after irradiation with xenon light. The maximum densities and the dye residual ratio at the reflection density of 1.0 for dye fixing materials (A) through (D) are shown in Table 1.

TABLE 1

| Dye fixing material | Mordant | Maximum density | Dye residual ratio (%) | Remarks |
|---|---|---|---|---|
| (A) | HP-1 | 1.80 | 64 | Comparative Example |
| (B) | P-3 | 2.15 | 65 | This Invention |
| (C) | P-8 | 2.18 | 65 | " |
| (D) | P-11 | 2.19 | 67 | " |

$$\text{Dye residual ratio} = \frac{\text{Dye density after irradiation with xenon light for 3 days}}{\text{Dye density before irradiation with xenon light}} \times 100$$

It will be apparent from Table 1 that the mordant according to this invention does not reduce but rather improves the fastness of transferred color images and yet gives a high cyan color image density.

EXAMPLE 2

The procedure of Example 2 was performed in the same manner as in Example 1 except that the dye providing substance having the following structure was used in lieu of the cyan dye providing substance in the light-sensitive material of Example 1. The results are shown in Table 2.

*Magenta dye providing substance

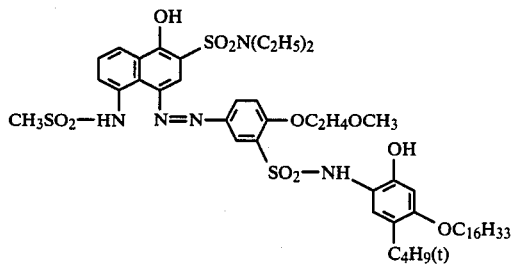

TABLE 2

| Dye fixing material | Mordant | Maximum density | Dye residual ratio (%) | Remarks |
|---|---|---|---|---|
| (A) | HP-1 | 1.90 | 73 | Comparative Example |
| (B) | P-3 | 2.26 | 74 | This Invention |
| (C) | P-8 | 2.30 | 75 | This Invention |
| (D) | P-11 | 2.29 | 91 | This Invention |

It will be apparent from Table 2 that the mordant according to this invention does not reduce but rather improves the fastness of the transferred color image and yet gives a high magenta color image density.

EXAMPLE 3

The procedure of Example 3 was performed in the same manner as in Example 1 except that the dye providing substance having the following structure was used in lieu of the cyan dye providing substance in the light-sensitive material of Example 1. The results are shown in Table 3.

*Yellow dye providing substance

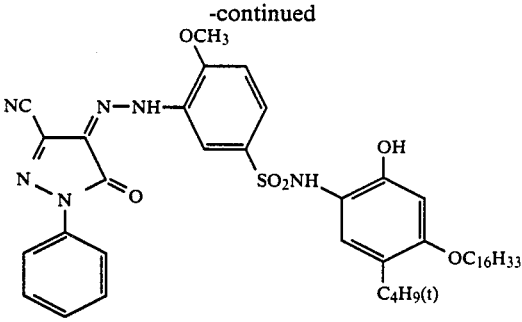

TABLE 3

| Dye fixing material | Mordant | Maximum density | Remarks |
|---|---|---|---|
| (A) | HP-1 | 1.75 | Comparative Example |
| (B) | P-3 | 2.11 | This Invention |
| (C) | P-8 | 2.12 | " |
| (D) | P-11 | 2.18 | " |

It will be apparent that the mordant according to this invention provides a yellow color image with an extremely high transfer density.

The excellent characteristics of the mordant according to this invention will be further described below with reference to systems using a layer construction and treatments different from those of Examples 1 to 3.

EXAMPLE 4

A dye fixing layer (E) (using HP-1) was prepared by coating the following layers on a polyethylene terephthalate support containing dispersed titanium oxide.

(1) Subbing Layer 80 g of a 10 wt % aqueous solution of polyvinyl alcohol (degree of saponification 98%), 40 g of a 20 wt % aqueous solution of polyacrylic acid, 1.5 g and 0.5 g of gelatin hardening agents H-1 and H-2, respectively, and 400 ml of water were uniformly mixed and coated on a support in a wet thickness of 70 μm.

(2) Hydrophilic thermal-solvent

| (a) Urea | 30 g |
|---|---|
| (b) N—methylurea | 40 g |
| (c) Water | 190 ml |
| (d) 10 wt % aqueous solution of polyvinyl alcohol (degree of saponification 98%) | 200 g |
| (e) 5% aqueous solution of Compound AA* | 20 ml |
| (f) Mordant HP-1 | 10 g |

The ingredients (a) through (f) were mixed and dissolved and the solution was uniformly coated on a layer as wet thickness of 90 μm.

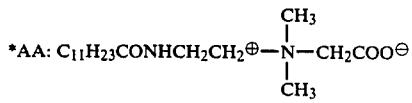

The same procedure as above was repeated except that 14.6 g of P-3, 16.1 g of P-8 and 26.8 g of P-11 were used to prepare dye fixing materials (F), (G) and (H), respectively, wherein the light-sensitive material used was prepared in the same manner as in Example 1.

The light-sensitive material was imagewise exposed at 2000 lux using a tungsten lamp for 10 seconds and, then, heated uniformly on a heat block at 140° C. for 20 seconds.

The coated side of thus heat-treated light-sensitive material was brought into contact with the coated side of the above dye fixing material and the assembly was passed through a heated roller at 130° C. for 40 seconds, whereby it was heated under pressure. Then, the dye fixing material was separated from the light-sensitive material, whereupon a cyan positive color image to the silver image was obtained on the color fixing material. The density of this negative image to red light was measured by means of a Macbeth reflection densitometer RD 519.

The maximum density of the above color image was measured by the same method as described in Example 1. The results are set forth in Table 4.

TABLE 4

| Dye fixing material | Mordant | Maximum density | Remarks |
|---|---|---|---|
| (E) | HP-1 | 1.74 | Comparative Example |
| (F) | P-3 | 2.05 | This Invention |
| (G) | P-8 | 2.10 | " |
| (H) | P-11 | 2.08 | " |

It will be apparent from Table 4 that in the above system, too, the mordant according to this invention provides a cyan color image having an extremely high transfer density.

EXAMPLE 5

The procedure of Example 5 was performed in the same manner as in Example 4 except that the magenta dye providing substance of Example 2 was used in lieu of the cyan dye providing substance in the light-sensitive material of Example 4. The results are shown in Table 5.

TABLE 5

| Dye fixing material | Mordant | Maximum density | Dye residual ratio (%) | Remarks |
|---|---|---|---|---|
| (E) | HP-1 | 1.67 | 75 | Comparative example |
| (F) | P-3 | 2.05 | 76 | This invention |
| (G) | P-8 | 2.02 | 77 | This invention |
| (H) | P-11 | 1.99 | 90 | This invention |

It will be apparent from Table 5 that the mordant according to this invention does not reduce but rather improves the fastness of the transferred color image and provides a magenta color image having a high density.

EXAMPLE 6

The procedure of Example 6 was performed in the same manner as in Example 4 except that the yellow dye providing substance of Example 3 was used in lieu of the cyan dye providing substance in the light-sensitive material of Example 4. The results are shown in Table 6.

TABLE 6

| Dye fixing material | Mordant | Maximum density | Remarks |
|---|---|---|---|
| (E) | HP-1 | 1.72 | Comparative Example |
| (F) | P-3 | 2.10 | This Invention |
| (G) | P-8 | 2.08 | " |
| (H) | P-11 | 2.19 | " |

It will be apparent from Table 6 that the dye mordant according to this invention provides a yellow color image having an extremely high transfer density.

It is clear from Examples 1 through 6 that in the color image forming process in which development is effected by heat treatment, the mordant according to this invention exhibits an excellent characteristic for all of cyan, magenta and yellow dyes by providing transferred images of extremely high density without loss in the light fastness of the dye images.

While the invention has been described in detail and with reference to specific embodiments thereof, it will be apparent to one skilled in the art that various changes and modifications can be made therein without departing from the spirit and scope thereof.

What is claimed is:

1. A photographic element comprising at least one support, a light-sensitive element which comprises a support having provided thereon a light-sensitive layer comprising a light-sensitive silver halide and a dye-providing material which dye-providing material forms a diffusible dye imagewise corresponding to developed silver, said diffusible dye being capable of migrating onto an image-receiving element, and an image-receiving element, said image-receiving element including a mordanting layer, said mordanting layer containing a polymer, as an only dye mordant in the photographic element, consisting essentially of a recurring unit of general formula (I) and at least one recurring unit selected from the group of units of general formulae (II), (III) and (IV)

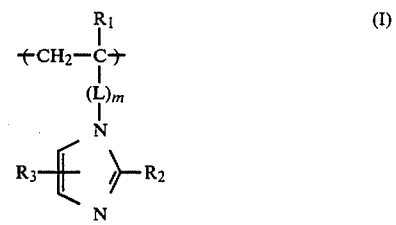

wherein $R_1$, $R_2$ and $R_3$ each represents a hydrogen atom or an alkyl group of 1 to 6 carbon atoms; L represents a divalent linking group of 1 to 20 carbon atoms; and m is 0 or 1;

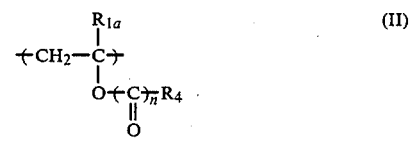

wherein $R_{1a}$ represents a hydrogen atom or an alkyl group of 1 to 6 carbon atoms; $R_4$ is an alkyl group, an aryl group or an aralkyl group; and n is 0 or 1;

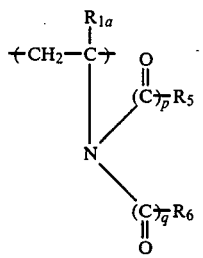 (III)

wherein $R_{1a}$ is as defined in general formula (II); $R_5$ and $R_6$ each represents a hydrogen atom or an alkyl group, an alkoxy group, an aryl group or an aralkyl group; and p and q each is equal to 0 or 1; and

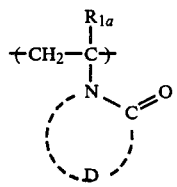 (IV)

wherein $R_{1a}$ is as defined in general formula (II); and D is a divalent linking group necessary for the formation of a 5- to 7-membered ring with the nitrogen atom and carbonyl group.

2. A photographic element as claimed in claim 1, wherein $R_1$, $R_2$, $R_3$ and $R_{1a}$ are selected from the group consisting of hydrogen atom, methyl group and ethyl group.

3. A photographic element as claimed in claim 1, wherein $R_4$, $R_5$ and $R_6$ in general formulae (II) and (III) are selected from the group consisting of methyl group, ethyl group, n-butyl group, iso-butyl group, phenyl group and benzyl group.

4. A photographic element as claimed in claim 1, wherein $R_5$ and $R_6$ in general formulae (II) and (III) are hydrogen atom.

5. A photographic element as claimed in claim 1, wherein the divalent linking group D in general formula (IV) is a group composed of carbon atoms.

6. A photograhic element as claimed in claim 1, wherein said divalent linking group D in general formula (IV) is a group composed of carbon atoms and a nitrogen atom.

7. A photographic element as claimed in claim 6, wherein said group composed of carbon atoms and a nitrogen atom is selected from the group consisting of —NHCH₂CH₂—,

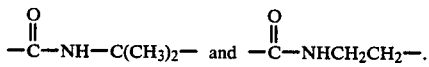

8. A photographic element as claimed in claim 1, wherein said divalent linking group D in general formula (IV) is a group composed of carbon atoms and an oxygen atom.

9. A photographic element as claimed in claim 8, wherein said group composed of carbon atoms and an oxygen atom is selected from the group consisting of —OCH₂CH₂—,

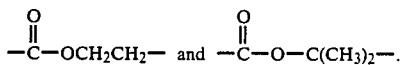

10. A photographic element as claimed in claim 1, wherein said divalent linking group D in general formula (IV) is a group composed of carbon atoms and a sulfur atom.

11. A photographic element as claimed in claim 10, wherein said group composed of carbon atoms and a sulfur atom is selected from the group consisting of —SCH₂CH₂— and

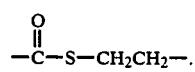

12. A photographic element as claimed in claim 1, wherein said recurring unit of general formula (I) is from 10 to 98 mol % of the total monomer units and said recurring unit of general formula (II) or (III) is from 2 to 60 mol % of the total monomer units.

13. A photographic element as claimed in claim 1, wherein the polymer includes not more than 40 mol % of other monomer units based on the total monomer units.

14. A photographic element as claimed in claim 1, wherein said dye-providing material forms a diffusible dye imagewise corresponding to the developed silver upon heat development of said photographic element.

15. A photographic element as claimed in claim 1, wherein said recurring unit of general formula (I) accounts for 40 to 90 mol % of the total monomer units and said recurring unit of general formulae (II), (III), and/or (IV) accounts for 10 to 15 mol % of the total monomer units.

16. A photographic element as claimed in claim 1, wherein said polymer includes a monomer recurring unit of the formula:

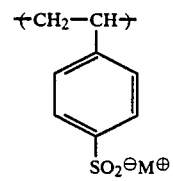

wherein M is an alkali metal.

17. A photographic element as claimed in claim 1, wherein said light-sensitive element and image-receiving element are disposed either on the same support or on independent supports.

18. The photographic element of claim 1, wherein said image-receiving element comprises a support having provided thereon said mordanting layer.

19. A process for fixing an imagewise formed diffusible dye and keeping the dye stable against light, which process comprises imagewise exposing a photographic element comprising at least one support, a light-sensitive silver halide element comprising a light-sensitive silver halide layer including a diffusible dye-providing material and an image-receiving element comprising a mordanting layer containing a polymer consisting essentially of a recurring unit of general formula (I) and at least one recurring unit selected from the group of units of general formulae (II), (III) and (IV)

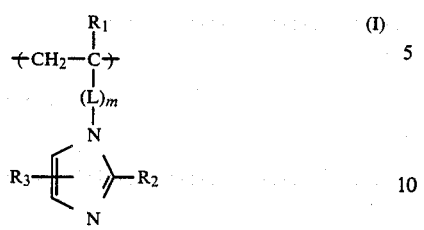

(I)

wherein $R_1$, $R_2$ and $R_3$ each represents a hydrogen atom or an alkyl group of 1 to 6 carbon atoms; L represents a divalent linking group of 1 to 20 carbon atoms; and m is 0 or 1;

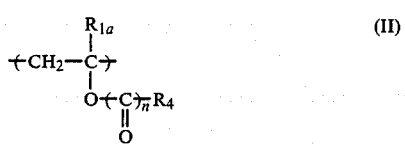

(II)

wherein $R_{1a}$ represents a hydrogen atom or an alkyl group of 1 to 60 carbon atoms; $R_4$ is an alkyl group, an aryl group or an aralkyl group; and n is 0 or 1;

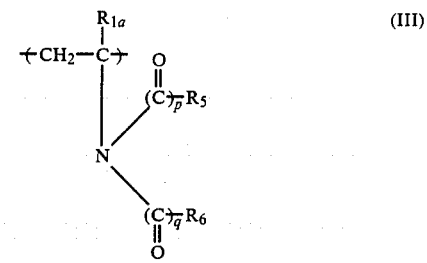

(III)

wherein $R_{1a}$ is as defined in general formula (II); $R_5$ and $R_6$ each represents a hydrogen atom or an alkyl group, an alkoxy group, an aryl group or an aralkyl group; and p and q each is equal to 0 or 1; and

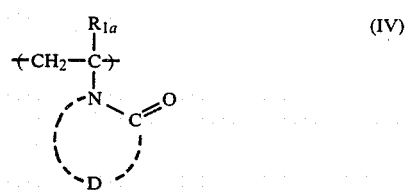

(IV)

wherein $R_{1a}$ is as defined in general formula (II); and D is a divalent linking group necessary for the formation of a 5- to 7-membered ring with the nitrogen atom and carbonyl group; developing the silver halide by heating to imagewise form a diffusible dye and causing the diffusible dye to diffuse to said mordanting layer, whereby the diffusible dye is fixed on the image-receiving element and is stable against light.

* * * * *